United States Patent [19]

Dupin

[11] Patent Number: 4,532,119

[45] Date of Patent: Jul. 30, 1985

[54] CATALYTIC DESULFURIZATION OF INDUSTRIAL WASTE GASES

[75] Inventor: Thierry Dupin, Garges-les-Gonesse, France

[73] Assignee: Rhone-Poulenc Specialites Chimiques, Courbevoie, France

[21] Appl. No.: 539,132

[22] Filed: Nov. 17, 1983

Related U.S. Application Data

[62] Division of Ser. No. 353,219, Mar. 1, 1982, Pat. No. 4,422,958.

[30] Foreign Application Priority Data

Mar. 13, 1981 [FR] France .............................. 81 05029

[51] Int. Cl.³ ...................... B01D 53/34; C01B 17/04; C01B 17/16
[52] U.S. Cl. .................................. 423/230; 423/244; 423/564; 423/574 R
[58] Field of Search .................. 423/230, 539, 244 D, 423/244 R, 573 R, 573 G, 574, 564

[56] References Cited

U.S. PATENT DOCUMENTS 4,388,288  6/1983  Dupin et al. .................. 423/416
4,422,958  12/1983  Dupin ............................ 502/217

Primary Examiner—Earl C. Thomas
Attorney, Agent, or Firm—Burns, Doane, Swecker & Mathis

[57] ABSTRACT

Industrial waste gases containing objectionable/polluting compounds of sulfur, e.g., $H_2S$, $SO_2$ and such organosulfur derivatives as COS, $CS_2$ and mercaptans, are catalytically desulfurized, e.g., by Claus process, employing an improved catalyst comprising titanium dioxide and calcium, barium, strontium or magnesium sulfate.

22 Claims, No Drawings

CATALYTIC DESULFURIZATION OF INDUSTRIAL WASTE GASES

CROSS-REFERENCE TO RELATED APPLICATION

This application is a division of application Ser. No. 353,219, filed Mar. 1, 1982, now U.S. Pat. No. 4,422,958, issued Dec. 27, 1983.

My copending application, Ser. No. 353,243 filed concurrently herewith and assigned to the assignee hereof.

BACKGROUND OF THE INVENTION

1. Field of the Invention

The present invention relates to a novel catalyst and to a process for the treatment therewith of industrial waste gases containing objectionable sulfur compounds. The invention more particularly relates to a novel catalyst based on titanium dioxide and containing alkaline earth metal sulfates, and to its use in Claus catalysis for the recovery of sulfur from waste gases containing, in particular, hydrogen sulfide, sulfur dioxide and, if appropriate, organic sulfur derivatives such as $CS_2$ and COS.

2. Description of the Prior Art

Various catalysts and processes utilizing same are well known to this art for the treatment, by catalytic conversion, of the organic sulfur compounds present in industrial waste gases.

Thus, in U.S. Ser. No. 256,978, U.S. Pat. No. 4,388,288 there are featured certain catalysts based on titanium dioxide which make it possible, in particular, to obtain excellent yields in recovered sulfur from gases containing hydrogen sulfide, sulfur dioxide and organic sulfur derivatives.

Nonetheless, serious need exists in this art for new and improved titanium dioxide such catalysts having enhanced strength and enhanced activity, together with an exceptional resistance to sulfation, especially at low temperature.

SUMMARY OF THE INVENTION

Accordingly, a major object of the present invention is the provision of an improved catalyst for the treatment of industrial waste gases containing objectionable sulfur compounds, said catalyst comprising titanium dioxide and an alkaline earth metal sulfate.

Consistent herewith, by the expression "treatment of sulfur compounds" there is intended any catalytic conversion of sulfur compounds emanating from industrial waste gases into compounds which can more readily be removed.

DETAILED DESCRIPTION OF THE INVENTION

More particularly according to this invention, the subject catalyst/process is especially well adapted for the treatment of industrial waste gases per the Claus process for the recovery of sulfur from gases containing, in particular, hydrogen sulfide, sulfur dioxide and, in certain instances, organic sulfur derivatives such as carbonyl sulfide, carbon disulfide and mercaptans.

The catalyst according to the invention comprises titanium dioxide and the sulfate of an alkaline earth metal selected from the group comprising calcium, barium, strontium and magnesium.

In a preferred embodiment hereof, the catalyst comprises titanium dioxide and calcium sulfate. The mechanical strength of this catalyst has proven to be exceptional.

The proportion by weight of titanium dioxide in the catalyst, relative to the total weight of the catalyst, preferably ranges from about 60 to about 99% and more preferably ranges from 80 to 99%.

The proportion by weight of alkaline earth metal sulfate, also relative to the total weight of catalyst, preferably ranges from about 1 to about 40% and more preferably ranges from 1 to 20%.

The catalyst according to the invention can be prepared by any suitable process which makes it possible to obtain either a unit mass product containing both the titanium dioxide and the alkaline earth metal sulfate, or a product consisting of titanium dioxide impregnated on the surface thereof with the alkaline earth metal sulfate.

According to a first method for preparation of the catalyst according to the invention, a shaped body based on titanium dioxide is successively impregnated with a compound which provides the sulfate anion and then with a compound which provides the alkaline earth metal cation, such as to form the alkaline earth metal sulfate in situ in the shaped body based on titanium dioxide.

According to this first, preferred method of preparation, the shaped body based on titanium dioxide is obtained, in particular, according to the process described in said U.S. Ser. No. 256,978, now U.S. Pat. No. 4,388,288. This process comprises the following steps:

(1) A mixture comprising:
 (i) from about 1 to about 40% by weight of water;
 (ii) from about 9 to about 15% by weight of shaping additive; and
 (iii) from about 45 to about 99% by weight of a poorly crystalline and/or amorphous titanium dioxide powder, having an ignition weight loss ranging from 1 to 50%, is malaxated;
(2) this intimate admixture is next shaped; and
(3) the resultant products are dried, if appropriate, and then calcined.

In the first step of this process, a mixture containing from about 1 to about 40% by weight of water, from about 0 to about 15% by weight of shaping additive, and from about 45 to about 99% by weight of a poorly crystalline and/or amorphous titanium dioxide powder having an ignition weight loss ranging from about 1 to 50%, is malaxated. The indicated percentages by weight are relative to the total weight of the mixture.

Preferably, in this first step, a mixture containing from about 5 to about 35% by weight of water, from about 0.1 to about 10% by weight of shaping additives, and from about 55 to about 94.9% by weight of a powder of poorly crystalline and/or amorphous titanium dioxide is malaxated.

The shaping additives which are used in this first step are those conventionally used for such shaping techniques. These additives provide the paste obtained by malaxation with the rheological properties suitable for shaping or molding. Examples of shaping additives which are particularly representative are: cellulose, carboxymethylcellulose, carboxyethylcellulose, tall oil, xanthane gums, surface-active agents, flocculating agents such as polyacrylamides, carbon black, starches, stearic acid, polyacrylic acid, polyvinyl alcohol, biopolymers, glucose, polyethylene glycol, and the like.

The poorly crystalline and/or amorphous titanium dioxide powder used displays a loss on ignition ranging from about 1 to 50% and preferably ranging from 5 to 40%. By the expression "poorly crystalline titanium dioxide" there is to be understood a titanium dioxide having an X-ray spectrum which shows halos in place of the principal lines of well crystallized titanium dioxide. And by the expression "amorphous titanium dioxide" there is to be understood a titanium dioxide, the X-ray diffraction spectrum of which does not exhibit any diffraction line. The loss on ignition (LOI) of the powder is measured as the loss in weight corresponding to the ratio:

$$LOI \text{ in } \% = (P_0 - P_1)/P_0,$$

in which
$P_0$ = initial weight of the starting material and
$P_1$ = weight of this starting material after calcination for 2 hours at 1,000° C. and cooling to ambient temperature in an anhydrous enclosure.

The starting material used in this process is an aqueous suspension essentially consisting of amorphous and/or poorly crystalline titanium dioxide. According to another embodiment of the process according to the invention, it is also envisaged to use any substance which can be converted to titanium dioxide on calcination, such as, for example, orthotitanic and metatitanic acids and titanium oxyhydroxides.

The aqueous suspension essentially consisting of amorphous and/or poorly crystalline titanium dioxide can be obtained, in particular, by the conventional process entailing the attack or acidulation of ilmenite with sulfuric acid, after hydrolysis and filtration. It can also be obtained from the hydrolysis of titanium compounds of the formula $TiCl_{4-n}(OR)_n$, in which "n" ranges from 0 to 4 and R is an alkyl radical preferably selected from among the following radicals: methyl, ethyl, isopropyl, butyl, hexyl and stearyl. The suspension can also be obtained via the precipitation of titanium salts with a base such as ammonia.

The powder having the desired LOI is prepared by drying the said suspension by conventional spraying or stoving techniques, or any other drying technique in which the resultant powder is maintained at a temperature below about 200° C.

The time used for malaxation of the mixture can vary over very wide limits and it generally varies from a few minutes to three hours.

According the one embodiment of this process, preferably up to about 30% by weight of a constituent selected from among silica, alumina, clays, silicates, titanium sulfate, ceramic fibers, and the like, are added to the mixture.

In the second step of this process, the mixture is shaped. The shaping can be used to produce products in the form of spheres, cylinders, pellets, small balls, granules, a honeycomb, or the like, of varied dimensions. Same can be obtained, in particular, using a pelletizing machine, a rotating granulator, an extrusion-molding machine, a machine for forming small balls, or a combination of an extrusion-molding machine with a rotating granulator.

In the third step of this process, the products obtained are dried, if appropriate, and then calcined. The dried or undried product is calcined at a temperature ranging from about 200° to 900° C. The calcination temperature makes it possible to adjust the specific surface area of the product obtained to a value ranging from about 5 to 300 m²/g. Calcination at high temperature typically yields a product having a low surface area and calcination at low temperature typically yields a product having a large specific surface area.

Furthermore, the shaped bodies or articles based on titanium dioxide obtained according to this process have a total pore volume ranging from about 0.05 to 0.5 cm³/g, a very high mechanical strength, measured by the particle-by-particle crushing method (PPC), and an exceptional resistance to attrition.

The pore volume of these shaped bodies can be very easily adjusted, in particular by adjusting the particle size of the titanium dioxide powder, by judiciously selecting the nature of the shaping additives and the loss on ignition of the shaped mixture, or by adjusting the calcination temperature. Furthermore, as is well known to those skilled in this art, the pore volume can be adjusted by adding pore-forming agents, such as, for example, wood charcoal, crystalline cellulose, starch, organic polymer, or the like, to the mixture.

According to the first method of preparation of the catalyst according to the invention, a shaped body based on titanium dioxide is successively impregnated with a compound which provides the sulfate anion and then with a compound which provides the alkaline earth metal cation, such as to in situ form the alkaline earth metal sulfate within the shaped body based on titanium dioxide. The product obtained is then dried, if appropriate, and calcined at a temperature ranging from about 300° to about 900° C. and preferably from 350° to 800° C.

The compound which provides the sulfate anion is selected from among the group comprising sulfuric acid and the sulfates which are soluble in aqueous solution, and in particular from among ammonium sulfate and hydroxylamine sulfate.

The impregnation is carried out such that the weight ratio of $SO_4$ to $TiO_2$ typically ranges from about 0.01 to about 0.15 and preferably from 0.05 to 0.10.

The compound which provides the alkaline earth metal cation is selected from the group comprising the alkaline earth metal salts which are soluble in aqueous solution, and in particular from among the alkaline earth metal nitrates, chlorides and acetates.

The impregnation is carried out such that the weight ratio of the alkaline earth metal to the titanium dioxide advantageously ranges from about 0.005 to about 0.20 and preferably from 0.02 to 0.15.

According to a second method for preparation of the catalyst according to the invention, a mixture containing, on the one hand, titanium dioxide, and, on the other hand, the alkaline earth metal sulfate or a mixture of a compound which provides the sulfate anion and a compound which provides the alkaline earth metal cation, is shaped.

The shaping can be carried out, in particular, by the process comprising the following steps, these steps being analogous to those previously described per U.S. Ser. No. 2,56,978, now U.S. Pat. No. 4,388,288. According to this process:
(1) A mixture comprising:
 (i) from about 1 to about 40% by weight of water;
 (ii) from about 0 to about 15% by weight of shaping additive; and
 (iii) from 45 to 99% by weight of a powder having an LOI ranging from 1 to 50% and consisting of poorly crystalline and/or amorphous titanium dioxide and of the alkaline earth metal sulfate, or a mixture of the compound which provides the alkaline earth metal cation, the weight ratio of SO$_4$ to TiO$_2$ in the powder ranging from about 0.01 to about 0.15, and preferably from 0.05 to 0.10, and the weight ratio of the alkaline earth metal to the titanium dioxide ranging from about 0.004 to about 0.20, and preferably from 0.02 to 0.15, is malaxated;

(2) the resulting intimate mixture is next shaped; and (3) the resultant products are dried, if appropriate, and then calcined at a temperature ranging from about 300° to about 900° C., and preferably from 350° to 800° C.

The compounds which provide the sulfate anion or the alkaline earth metal cation, and their proportions relative to the weight of TiO$_2$, are those above described in the first method of preparation of the catalyst according to the invention.

According to a third method for preparation of the catalyst according to the invention, the starting material employed is the titanium dioxide originating from the attack of ilmenite with sulfuric acid, after hydrolysis, filtration and drying, and containing sulfate anions, for example, in the form of sulfuric acid, titanyl sulfate, titanium sulfate and/or basic salts, for example, those of the general formula:

$$Ti(OH)_x(HSO_4)_y,$$

in which $x+y=4$.

According to a first variant of this third method for preparation of the catalyst of the invention, the procedure involves the following steps, which are analogous to those described above per U.S. Ser. No. 256,978, now U.S. Pat. No. 4,388,288:

(a) A mixture comprising:
  (i) from about 1 to about 40% by weight of water;
  (ii) from about 0 to about 15% by weight of shaping additive; and
  (iii) from 45 to 99% by weight of a powder consisting of a compound which provides the alkaline earth metal cation, and of titanium dioxide originating from the attack of ilmenite with sulfuric acid and containing sulfate anions, the weight ratio of SO$_4$ to TiO$_2$ in the powder ranging from about 0.01 to about 0.15 and preferably from 0.05 to 0.10, and the weight ratio of the alkaline earth metal to the titanium dioxide in the powder ranging from about 0.004 to 0.20 and preferably from 0.02 to 0.15, and the loss on ignition of this powder ranging from about 1 to about 50%, is malaxated;

(b) the mixture is next shaped; and (c) the resultant products are dried, if appropriate, and then calcined at a temperature ranging from about 300° C. to about 900° C. and preferably from 350° to 800° C.

According to a second variant of this third method for preparation of the catalyst according to the invention, the procedure involves the following steps:

(A) A mixture comprising:
  (i) from about 1 to about 40% by weight of water;
  (ii) from about 0 to about 15% by weight of shaping additive; and
  (iii) from 45 to 99% by weight of a titanium dioxide powder originating from the attack of ilmenite with sulfuric acid and containing sulfate anions, the weight ratio of SO$_4$ to TiO$_2$ in the powder ranging from about 0.01 to about 0.15 and preferably from 0.05 to 0.10, and the LOI of this powder preferably ranging from about 1 to about 50%, is malaxated;

(B) the mixture is shaped and the product is then dried and calcined, if appropriate, at a temperature ranging from about 300° C. to about 900° C. and preferably from 350° C. to 800° C.;

(C) the shaped article is next impregnated with a compound which is soluble in aqueous solution and which provides the alkaline earth metal cation; and (D) the resultant products are dried, if appropriate, and then calcined at a temperature ranging from about 300° to 900° C. and preferably from 350° to 800° C.

According to a fourth method for preparation of the catalyst according to the invention, a shaped body based on titanium dioxide and containing the alkaline earth metal cation is sulfated. This sulfation can be carried out at a temperature ranging from 250° to 550° C. by a gas preferably containing a mixture of sulfur dioxide and air, the weight ratios SO$_4$/TiO$_2$ and (alkaline earth metal)/TiO$_2$ being those set forth above.

The products prepared in this manner are subsequently dried, if appropriate, and then calcined at a temperature ranging from 300° to 900° C. and preferably from 350° to 800° C.

The present invention also relates to the utilization of the subject catalysts in Claus catalysis for the recovery of sulfur from gases containing, in particular, hydrogen sulfide and, if appropriate, sulfur dioxide and organic sulfur derivatives.

In the conventional Claus process, to which the invention is nonetheless not limited, however, the recovery of sulfur from gases containing hydrogen sulfide and, if appropriate, organic sulfur derivatives, comprises two steps.

In a first step, the hydrogen sulfide is burned in the presence of an amount of air which is adjusted such as to convert a portion of the gas to sulfur dioxide, and then, in a second step, the gaseous mixture which results is charged through a reactor containing a catalyst on which the following reaction takes place:

$$2H_2S + SO_2 \rightleftharpoons (3/n)S_n + H_2O \tag{1}.$$

It too has unexpectedly been discovered that the catalysts of this invention make it possible to achieve higher yields than those obtained with the conventional catalysts, for shorter contact times.

According to a first specific method of utilizing the catalysts of the invention, a gaseous mixture comprising hydrogen sulfide is combusted, at about 1,000° C., with an amount of air which is adjusted such as to convert a proportion of the hydrogen sulfide present into sulfur dioxide. Sulfur can also be produced and, after the gas has been passed through a heat recovery boiler, it is charged through a first sulfur condenser. The gas is then conveyed through a series of reactors (in general two or three) containing the catalyst obtained according to the process of the invention, in which reactors the reaction (1) takes place.

The gases emitted are cooled in a sulfur condenser and reheated upon entering each reactor.

Apart from the hydrogen sulfide, the Claus gases can contain carbon compounds of sulfur, such as COS and CS$_2$, which are generally relatively stable in the catalytic converters and which contribute to a 20 to 50% increase in the emissions of SO$_2$ and sulfur compounds into the atmosphere after incineration of the fumes. These very troublesome compounds are either already contained in the gas to be treated or are formed during the first step at high temperature.

The catalysts of the invention make it possible to remove these extremely troublesome carbon compounds of sulfur by hydrolysis according to reactions (2), (3) and/or (4):

$$CS_2 + 2H_2O \rightleftharpoons CO_2 + 2H_2S \qquad (2)$$

$$CS_2 + H_2O \rightleftharpoons COS + H_2S \qquad (3)$$

$$COS + H_2O \rightleftharpoons CO_2 + H_2S \qquad (4)$$

According to a second specific embodiment of the invention, Claus gases containing, in particular, hydrogen sulfide, carbon disulfide and/or carbon oxysulfide and sulfur dioxide necessary for carrying out reactions (1), (2), (3) and (4) simultaneously, are conveyed through a series of reactors (in general two or three) containing the catalyst of the invention.

The catalysts of the invention have a higher activity than that obtained with the conventional catalysts for reaction (1). By performing this reaction with a better yield in a shorter time, same therefore make it possible to reduce the size of the reactors used.

Furthermore, these catalysts are not sensitive to the presence of oxygen in said gases, up to proportions of about 2%, and they are not, therefore, deactivated by sulfation as are the conventional catalysts. Thus, the catalysts according to the invention have a very much longer useful life than that of the known catalysts.

In particular at low temperature, the accidental or incidental presence of oxygen in the gases treated in no way deactivates the catalyst, which completely regains its initial activity when there no longer remains any oxygen in the gases.

Furthermore, by performing reactions (2), (3) and/or (4) with yields close to 100%, the catalysts according to the invention make it possible to substantially improve the overall yield for the recovery of the sulfur, and to considerably reduce the noxiousness of the gases discharged into the atmosphere. Moreover, the catalysts of the invention are not sensitive to the presence of oxygen as regard the reactions (2), (3) and/or (4).

The catalysts of the invention can also be utilized for the treatment of gases containing small proportions of hydrogen sulfide (in general less than 5%).

In order to further illustrate the present invention and the advantages thereof, the following specific examples are given, it being understood that same are intended only as illustrative and in nowise limitative.

In said examples, the following determinations were measured as outlined:
(1) The specific surface areas (SBE) were measured by the conventional nitrogen absorption method designated the BET method.
(2) The pore volumes (TPV) and the average pore diameters ($\phi_m$) were determined by the conventional mercury penetration method. A distinction was made between the microporous volume Vmp, which corresponds to pore diameters of less than 50 nm, and the macroporous volume VMP, which corresponds to pore diameters of greater than 50 nm; for each category, an average pore diameter can be determined.
(3) The mechanical strength was measured, on the one hand, by the particle-by-particle crushing method (PPC). This consisted of measuring the maximum compressive force which a granule could withstand before breaking, when the product was placed between two planar surfaces moving together at a constant speed of 5 cm/minute. In the particular case of spheres, the force is expressed in Newtons. In the particular case of extrudates or pellets, the compression was applied perpendicularly to one of the generatrices of the product, and the particle-by-particle crushing is expressed as the ratio of the compressive force to the length of the generatrix and, therefore, is in Newtons/m.
(4) The mechanical strength was measured, on the other hand, by the attrition resistance (AR). This method consisted of measuring the amount of dust produced by 100 grams of granules placed on a No. 24 sieve having a diameter of 20 cm, of the AFNOR X11-501 series, and vibrated for 10 minutes by means of a vibrator of trademark Fenwick Rex. The AR is the weight of dust recovered.

EXAMPLE 1

A suspension obtained after hydrolysis of titanium tetrachloride was washed by decantation and filtered, and the solid was then dried in an oven at 110° C. for 24 hours. The powder obtained had an amorphous structure as determined by X-rays and its LOI was 18%.

A mixture consisting of this powder, to which water and carboxymethylcellulose had been added in the following proportions:
(i) 66% of this powder;
(ii) 32% of water; and
(iii) 2% of carboxymethylcellulose,
was malaxated for 30 minutes.

This mixture was then extruded through a 3 mm die and the extrudates were dried at 110° C. for 8 hours and then calcined at 450° C. for 2 hours. The characteristics of the resultant extruded products were as follows:
SBE = 135 $m^2g^{-1}$
TPV = 0.32 $cm^3g^{-1}$
PPC = 15.7·$10^3$N/m
AR = 1.9%

One kilogram of product was first impregnated with 310 $cm^3$ of a solution of ammonium sulfate such as to provide a weight ratio $SO_4/TiO_2$ = 0.06, and dried at 100° C. for 4 hours.

The dried products were then impregnated with 300 $cm^3$ of a solution of calcium nitrate such as to provide a weight ratio $Ca/TiO_2$ = 0.025.

The product was dried at 110° C. for 12 hours and then calcined at 450° C. for 1 hour; it then had the following characteristics:
SBE = 117 $m^2g^{-1}$
TPV = 0.30 $cm^3g^{-1}$
PPC = 26.5·$10^3$N/m
AR = 0.5%

It is therefore quite apparent that the catalysts according to the invention display a very markedly improved mechanical strength (PPC and AR).

EXAMPLE 2

The extruded products described in Example 1 were impregnated with a solution of sulfuric acid such as to provide a weight ratio $SO_4/TiO_2$ = 0.1; after drying at 100° C. for 4 hours, impregnation was carried out with a solution of strontium acetate having a concentration such that a weight ratio $Sr/TiO_2$ = 0.091 was provided.

After drying at 110° C. for 4 hours and then calcination at 450° C. for 2 hours, the catalysts obtained had the following characteristics:
SBE = 105 $m^2g^{-1}$ TPV=28 cm³g⁻¹
PPC=34.3·10³N/m
AR=0.8%

EXAMPLE 3

A suspension obtained after hydrolysis of titanium tetrachloride was washed by decantation and filtered, and the solid was then dried in an oven at 110° C. for 24 hours.

A mixture consisting of this powder, to which water and calcium sulfate had been added in the following proportions by weight:

(i) 71% of this powder;
(ii) 8% of calcium sulfate; and
(iii) 21% by water, was malaxated for 45 minutes.

The weight ratio $Ca/TiO_2$ was then: 0.04 and the weight ratio $SO_4/TiO_2$ was 0.10.

This mixture was then extruded through a 5 mm die and the extrudates were dried at 110° C. for 4 hours and then calcined at 600° C. for 1 hour. The characteristics of the resultant catalyst were as follows:

SBE=58 m²g⁻¹
TPV=27 cm³g⁻¹
PPC=18.6·10³N/m
AR=0.4%

EXAMPLE 4

A solution obtained after hydrolysis of titanium tetrachloride was washed and then filtered. The cake was then dispersed in a solution of ammonium sulfate and the solution obtained was spray-dried, the weight ratio $SO_4/TiO_2$ then being 0.1

The powder obtained was malaxated for 30 minutes in the presence of water and calcium acetate in the following proportions:

(i) 66% of the powder;
(ii) 8% of calcium acetate; and
(iii) 26% of water.

The weight ratio $Ca/TiO_2$ was then 0.041.

The mixture was then extruded through a 3 mm die and the extrudates were dried at 110° C. for 4 hours and then calcined at 500° C. for 2 hours. The characteristics of the resultant catalyst obtained were as follows:

SBE=96 m²g⁻¹
TPV=28 cm³g⁻¹
PPC=22.5·10³N/m
AR=0.5%

EXAMPLE 5

Calcium nitrate was incorporated into a suspension of titanium oxide obtained, after hydrolysis and filtration, by the conventional process for the attack or acidulation of ilmenite with sulfuric acid, and containing the sulfate anions in an amount such that the weight ratio $SO_4/TiO_2=0.08$, the nitrate being incorporated such as to cause all the sulfates to react, and the weight ratio $Ca/TiO_2$ then being 0.033.

The suspension was dried at 150° C. for 1 hour.

The powder obtained was malaxated for 2 hours in the presence of water in the following proportions:

(i) 64% of this powder; and
(ii) 36% of water.

The mixture was then extruded through a 4 mm die and the extrudates were dried at 110° C. for 4 hours and then calcined at 400° C. for 2 hours.

The characteristics of the resultant catalyst were as follows:

SBE=146 m²g⁻¹
TPV=0.35 cm³g⁻¹
PPC=23.5·10³N/m
AR=0.4%

EXAMPLE 6

A suspension of titanium oxide obtained, after hydrolysis and filtration, by the conventional process for the attack of ilmenite with sulfuric acid was dried at 180° C. for 1 hour; the weight ratio $SO_4/TiO_2=0.08$.

The powder obtained was malaxated for 2 hours, 30 minutes, in the presence of water and barium nitrate in the following proportions:

(i) 64% of this powder;
(ii) 8% of barium nitrate; and
(iii) 28% of water.

The weight ratio $Ba/TiO_2$ was then 0.113.

The mixture was extruded through a 5 mm die and the extrudates were dried at 110° C. for 4 hours and then calcined at 500° C. for 1 hour. The characteristics of the resultant catalyst were as follows:

SBE=107 m²g⁻¹
TPV=0.32 cm³g⁻¹
PPC=28.4·10³N/m
AR=0.2%

EXAMPLE 7

A suspension of titanium oxide obtained, after hydrolysis and filtration, by the conventional process for the attack of ilmenite with sulfuric acid was dried by passage through a heat exchanger in which the suspension, and then the powder, were conveyed by means of an endless screw which was heated by a heat-transfer fluid. The weight ratio $SO_4/TiO_2$ was equal to 0.085.

A mixture containing:

(i) 69% of this powder;
(ii) 30.8% of water; and
(iii) 0.2% of polyacrylamide.

was prepared by malaxation for 20 minutes.

This mixture was introduced into an extruder and extruded through a die of diameter 5 mm. The extrudates obtained were dried at 110° C. for 24 hours and then calcined at 350° C. for 2 hours in air in an electric furnace.

The characteristics of the finished product were as follows:

SBE=158 m²g⁻¹
TPV=0.29 cm³/100 g
$\phi_m$=7 nm
PPC=17.6·10³N/m
AR=1.2%

1,000 g of these extrudates were impregnated with 230 cm³ of a solution of calcium nitrate such as to provide a weight ratio $Ca/TiO_2=0.035$.

The product was dried at 110° C. for 4 hours and then calcined at 400° C. for 2 hours. The characteristics of the resultant catalyst were as follows:

SBE=158 m²g⁻¹
TPV=0.28 cm³g⁻¹
PPC=28.5·10³N/m
AR=0.3%

EXAMPLE 8

The same extrudates as those described in Example 1 were used. 1,000 g of these extrudates were impregnated with 310 cm³ of a solution of calcium nitrate such as to provide a weight ratio $Ca/TiO_2=0.02$.

The product was dried at 110° C. for 2 hours.

The product was calcined at 450° C. for 7 hours in a stream of gas having the following composition by volume:
(i) 10% of $SO_2$; and
(ii) 90% of air.

The resultant catalyst had the following characteristics:
$SBE = 95 \text{ m}^2\text{g}^{-1}$
$TPV = 0.31 \text{ cm}^3\text{g}^{-1}$
$PPC = 22.5 \cdot 10^3 \text{ N/m}$
$AR = 0.8\%$

EXAMPLE 9

The present example illustrates the application of the catalysts of the invention, obtained according to Examples 1 to 5, in the reaction:

$$2H_2S + SO_2 \rightarrow (3/n)S_n + H_2O \quad (1).$$

A gas was charged through a series of three isothermal reactors under the following conditions:
(a) Composition of the gas by volume upon inlet into the first reactor:
$H_2S$: 9%
$SO_2$: 4.5%
$H_2O$: 20%
$N_2$: 66.5%
The temperature of the reactor was 300° C.
Catalyst: that obtained according to Example 5.
(b) Composition of the gas by volume upon inlet into the second reactor:
$H_2S$: 2.5%
$SO_2$: 1.25%
$H_2O$: 27%
$N_2$: 69.25%
The temperature of the reactor was 250° C.
Catalyst: that obtained according to Example 5.
(c) Composition of the gas by volume upon inlet into the third reactor:
$H_2S$: 1%
$SO_2$: 0.5%
$H_2O$: 30%
$N_2$: 68.5%
The temperature of the reactor was 220° C.
Catalyst: that obtained according to Example 1.

The yields of sulfur indicated in the Table I below were obtained by determining, by chromatographic analysis, the gases entering and exiting each reactor. It should be noted that the thermodynamic efficiency was 86.2% for the first reactor, 79.5% for the second reactor and 72.5% for the third reactor.

By way of comparison, Table I below also indicates the results obtained with conventional alumina catalysts.

TABLE I

| | Contact time in seconds | 0.25 | 0.5 | 1 | 2 | 3 |
|---|---|---|---|---|---|---|
| First Reactor | Catalyst of the invention; Example 5 | 83 | 85 | 86 | 86 | 86 |
| | Alumina | 68 | 75 | 82 | 83 | 83 |
| Second Reactor | Catalyst of the invention; Example 5 | 59 | 69 | 72 | 78 | 79 |
| | Alumina | 25 | 48 | 59 | 70 | 71 |
| Third Reactor | Catalyst of the invention; Example 1 | 47 | 54 | 64 | 66 | 68 |

TABLE I-continued

| Contact time in seconds | 0.25 | 0.5 | 1 | 2 | 3 |
|---|---|---|---|---|---|
| Alumina | 17 | 43 | 55 | 56 | 57 |

It is clearly apparent from this Table that the catalysts according to the invention unable obtainment of considerably greater yields of sulfur than those obtained utilizing a conventional catalyst, for the same contact times.

Furthermore, the introduction of 5,000 ppm of oxygen does not at all modify the yields obtained in the case of the catalysts of the invention, whereas the yields decrease by about 25% in the case of the conventional catalysts.

EXAMPLE 10

The present example illustrates the application of the catalysts of the invention, obtained according to Example 6, in the reactions:

$$2H_2S + SO_2 \rightarrow (3/n)S_n + H_2O \quad (1)$$

$$CS_2 + 2H_2O \rightarrow CO_2 + 2H_2S \quad (2).$$

A gas having the following composition by volume:
$H_2S$: 6%
$SO_2$: 4%
$CS_2$: 1%
$H_2O$: 28%
$N_2$: 61%
was charged through a reactor.

The reactor was provided with a temperature profile similar to that obtained in an industrial (adiabatic) reactor, under the following conditions:

TABLE II

| Contact time, in seconds | 1 | 2 | 3 | 4 |
|---|---|---|---|---|
| Temperature, in °C. | 260 | 330 | 340 | 340 |

The temperature upon inlet of the gases into the reactor was 225° C.

The yields obtained of the hydrolysis (2) are recorded in Table III below:

TABLE III

| Contact time, in seconds | 1 | 2 | 3 | 4 |
|---|---|---|---|---|
| Catalyst of the invention | 72 | 96 | 99 | 100 |
| Alumina | 3 | 14 | 32 | 53 |

It is apparent that the catalysts of the invention enable obtainment of considerably higher yields by $CS_2$ hydrolysis than those obtained utilizing a conventional catalyst, for the same contact times.

The yields obtained of sulfur (1) are recorded in Table IV below. It should be noted that the thermodynamic efficiency corresponding to the reaction conditions was 66.5%.

TABLE IV

| Contact time, in seconds | 1 | 2 | 3 | 4 |
|---|---|---|---|---|
| Catalyst of the invention | 66 | 66 | 66 | 66 |
| Alumina | 55 | 60 | 63 | 64 |

The introduction of 2% of oxygen into the reaction system did not at all modify the yields obtained in the case of the catalysts of the invention, whereas the yields decreased by one-half on the case of conventional catalysts.

EXAMPLE 11

The present example illustrates the application of the catalysts of the invention, obtained according to Example 6, in the reaction:

$$2H_2S + SO_2 \rightarrow (3/n)S_n + H_2O \qquad (1)$$

$$COS + H_2O \rightarrow CO_2 + H_2S \qquad (4).$$

A gas having the following composition:
H$_2$S: 7.7%
SO$_2$: 4.4%
COS: 0.3%
H$_2$O: 28%
N$_2$: 60%
was charged through a reactor under the same conditions as those described in Example 10.

The obtained yields of hydrolysis (4) are recorded in Table V below:

TABLE V

| Contact time, in seconds | 1 | 2 | 3 | 4 |
|---|---|---|---|---|
| Catalyst of the invention | 85 | 98 | 100 | 100 |
| Alumina | 4 | 17 | 39 | 60 |

It is apparent that the catalysts of the invention enable obtainment of considerably higher yields by hydrolysis of COS than those obtained utilizing a conventional catalyst, for the same contact times.

EXAMPLE 12

The present example illustrates the application of the catalysts of the invention, obtained according to Example 1, in the reaction:

$$2H_2S + SO_2 \rightarrow (3/n)S_n + H_2O$$

at low temperature, after simulating the introduction of 2% of oxygen into the gases treated.

The composition of the gases inleting into the reactor was as follows:
H$_2$S: 1%
SO$_2$: 0.5%
H$_2$O: 30%
N$_2$: 68.5%

The temperature of the reactor was 220° C.

The catalyst of Example 1 was used to treat the above gases for 24 hours.

The yields of sulfur obtained were as follows, as a function of the contact time:

TABLE VI

| Contact time, in seconds | 0.25 | 0.5 | 1 | 2 | 3 |
|---|---|---|---|---|---|
| Yield of sulfur, % | 47 | 54 | 64 | 66 | 68 |

2% of the nitrogen was replaced with oxygen in the gas treated, the composition of the gas treated then being:
H$_2$S: 1%
SO$_2$: 0.5%
H$_2$O: 30%
N$_2$: 66.5%
O$_2$: 2%

After 24 hours, the oxygen was removed in order to return to the initial composition of the gases, the yields of sulfur then being as follows, after 2 hours of operation without oxygen:

TABLE VII

| Contact time, in seconds | 0.25 | 0.5 | 1 | 2 | 3 |
|---|---|---|---|---|---|
| Yield of sulfur, % | 45 | 55 | 63 | 67 | 68 |

It is therefore apparent from the aforesaid results that the activity of the catalyst according to the invention is not at all modified as a result of the introduction of a very substantial amount of oxygen into the gases being treated. This particular advantage of the catalysts according to the invention proves to be of considerable practical importance for the treatment of industrial waste gases containing objectionable sulfur compounds.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. In a process for catalytically desulfurizing industrial waste gases containing objectionable/polluting compounds of sulfur comprising at least one of H$_2$S, SO$_2$ and organic sulfur compounds, by Claus process reactions to convert said sulfur compounds into elemental sulfur and/or compounds which can be more readily removed, the improvement which comprises employing as the desulfurizing catalyst therefor, a catalyst composition having enhanced mechanical strength and activity, and displaying marked resistance to sulfation, comprising (i) titanium dioxide, and (ii) the sulfate of an alkaline earth metal which is calcium, barium, strontium or magnesium.

2. The process as defined by claim 1, the amount by weight of the titanium dioxide in the catalyst composition therein, relative to the total weight thereof, ranging from about 60 to about 99%.

3. The process as defined by claim 2, the amount by weight of the titanium dioxide in the catalyst composition therein, relative to the total weight thereof, ranging from about 80 to about 99%.

4. The process as defined by claim 2, the amount by weight of the alkaline earth metal sulfate in the catalyst composition employed therein, relative to the total weight thereof, ranging from about 1 to about 40%.

5. The process as defined by claim 3, the amount by weight of the alkaline earth metal sulfate in the catalyst composition employed therein, relative to the total weight thereof, ranging from about 1 to about 20%.

6. The process as defined by claim 1, the amount by weight of the alkaline earth metal sulfate in the catalyst composition employed therein, relative to the total weight thereof, ranging from about 1 to about 40%.

7. The process as defined by claim 1, the catalyst composition employed therein having a specific surface area ranging from about 5 to about 300 M$^2$/g.

8. The process as defined by claim 1, the catalyst composition employed therein having a total pore volume ranging from about 0.05 to 0.5 cm$^3$/g.

9. The process as defined by claim 1, the catalyst composition employed therein comprising titanium dioxide and calcium sulfate.

10. The process as defined by claim 6, the catalyst composition employed therein having a specific surface area ranging from about 5 to about 300 M$^2$/g.

11. The process as defined by claim 6, the catalyst composition employed therein having a total pore volume ranging from about 0.05 to 0.5 cm$^3$/g.

12. The process as defined by claim 6, the catalyst composition employed therein comprising titanium dioxide and calcium sulfate.

13. The process as defined by claim 1, the catalyst composition employed therein having been shaped and activated by calcination.

14. The process as defined by claim 2, the catalyst composition employed therein having been shaped and activated by calcination.

15. The process as defined by claim 3, the catalyst composition employed therein having been shaped and activated by calcination.

16. The process as defined by claim 4, the catalyst composition employed therein having been shaped and activated by calcination.

17. The process as defined by claim 5, the catalyst composition employed therein having been shaped and activated by calcination.

18. The process as defined by claim 6, the catalyst composition employed therein having been shaped and activated by calcination.

19. The process as defined by claim 1, wherein the objectionable/polluting compound of sulfur comprises at least one of H$_2$S, CS$_2$, COS or mercaptans.

20. The process as defined by claim 1, wherein the catalyst composition further includes up to about 30% by weight of silica, alumina, clays, silicates, titanium sulfate, or ceramic fibers.

21. The process as defined by claim 1, wherein said Claus process reactions comprise at least one of the reactions:
 (a) $2H_2S + SO_2 \rightleftharpoons (3/n)S_n + H_2O$,
 (b) $CS_2 + 2H_2O \rightleftharpoons CO_2 + 2H_2S$
 (c) $CS_2 + H_2O \rightleftharpoons COS + H_2S$
 (d) $COS + H_2O \rightleftharpoons CO_2 + H_2S$.

22. In a process for catalytically desulfurizing industrial waste gases containing objectionable/polluting compounds of sulfur comprising at least one of H$_2$S, SO$_2$, COS, CS$_2$ and mercaptans by Claus process reactions comprising at least one of the reactions:
 (a) $2H_2S + SO_2 \rightleftharpoons (3/n)S_n + H_2O$,
 (b) $CS_2 + 2H_2O \rightleftharpoons CO_2 + 2H_2S$
 (c) $CS_2 + H_2O \rightleftharpoons COS + H_2S$
 (d) $COS + H_2O \rightleftharpoons CO_2 + H_2S$.
to convert said sulfur compounds into elemental sulfur and/or H$_2$S, the improvement which comprises employing as the desulfurizing catalyst therefor, a catalyst composition having enhanced mechanical strength and activity, and displaying marked resistance to sulfation, comprising (i) titanium dioxide, and (ii) the sulfate of an alkaline earth metal which is calcium, barium, strontium or magnesium.

* * * * *